(12) United States Patent
Reynolds et al.

(10) Patent No.: US 9,298,751 B2
(45) Date of Patent: Mar. 29, 2016

(54) DISPOSAL OF RARELY USED MEMBER VARIABLES VIA SHADOW STRUCTURES

(71) Applicant: Oracle International Corporation, Redwood Shores, CA (US)

(72) Inventors: Nathan Reynolds, Mesa, AZ (US); Mikhail Dmitriev, Campbell, CA (US)

(73) Assignee: Oracle International Corporation, Redwood Shores, CA (US)

( * ) Notice: Subject to any disclaimer, the term of this patent is extended or adjusted under 35 U.S.C. 154(b) by 137 days.

(21) Appl. No.: 13/796,664

(22) Filed: Mar. 12, 2013

(65) Prior Publication Data

US 2014/0280364 A1 Sep. 18, 2014

(51) Int. Cl.
*G06F 17/30* (2006.01)
*G06F 7/00* (2006.01)
*G06F 9/45* (2006.01)
*G06F 9/455* (2006.01)
*G06F 12/02* (2006.01)

(52) U.S. Cl.
CPC ........ *G06F 17/30292* (2013.01); *G06F 8/4434* (2013.01); *G06F 9/45525* (2013.01); *G06F 8/4443* (2013.01); *G06F 12/0253* (2013.01)

(58) Field of Classification Search
None
See application file for complete search history.

(56) References Cited

U.S. PATENT DOCUMENTS

| | | | | |
|---|---|---|---|---|
| 6,658,652 | B1 * | 12/2003 | Alexander et al. | 717/128 |
| 2003/0120824 | A1 * | 6/2003 | Shattuck et al. | 709/313 |
| 2003/0177477 | A1 * | 9/2003 | Fuchs | 717/136 |
| 2008/0209404 | A1 * | 8/2008 | Brady | 717/128 |
| 2009/0024679 | A1 * | 1/2009 | Amundsen et al. | 707/206 |

* cited by examiner

*Primary Examiner* — Sangwoo Ahn
(74) *Attorney, Agent, or Firm* — Marger Johnson

(57) ABSTRACT

A computer-controlled method can include determining at least one rarely-used field within a class, creating a shadow structure corresponding to the class, and moving the at least one rarely-used field from the class to the shadow structure. The method can also include adding a shadow reference to the class, the shadow reference corresponding to the shadow structure.

21 Claims, 3 Drawing Sheets

DISPOSAL OF RARELY USED MEMBER VARIABLES VIA SHADOW STRUCTURES

BACKGROUND

In current systems, depending on how the object instances of a particular class are used, there are usually multiple member variables that are rarely used. These rarely-used member variables usually consume a significant amount of heap space. Indeed, for certain heap dumps, up to—or even more than—25% of the heap may be used by such rarely-used member variables. Currently, the only recognized solution is to add more memory, e.g., RAM, to the target machine(s), but such action necessarily requires additional hardware components and, consequently, results in overall increased cost of the system. Indeed, there are currently no known mechanisms for reducing the heap impact of rarely-used member variables.

Accordingly, there remains a need for a way to address these and other deficiencies associated with the prior art.

DETAILED DESCRIPTION

Figure 1:
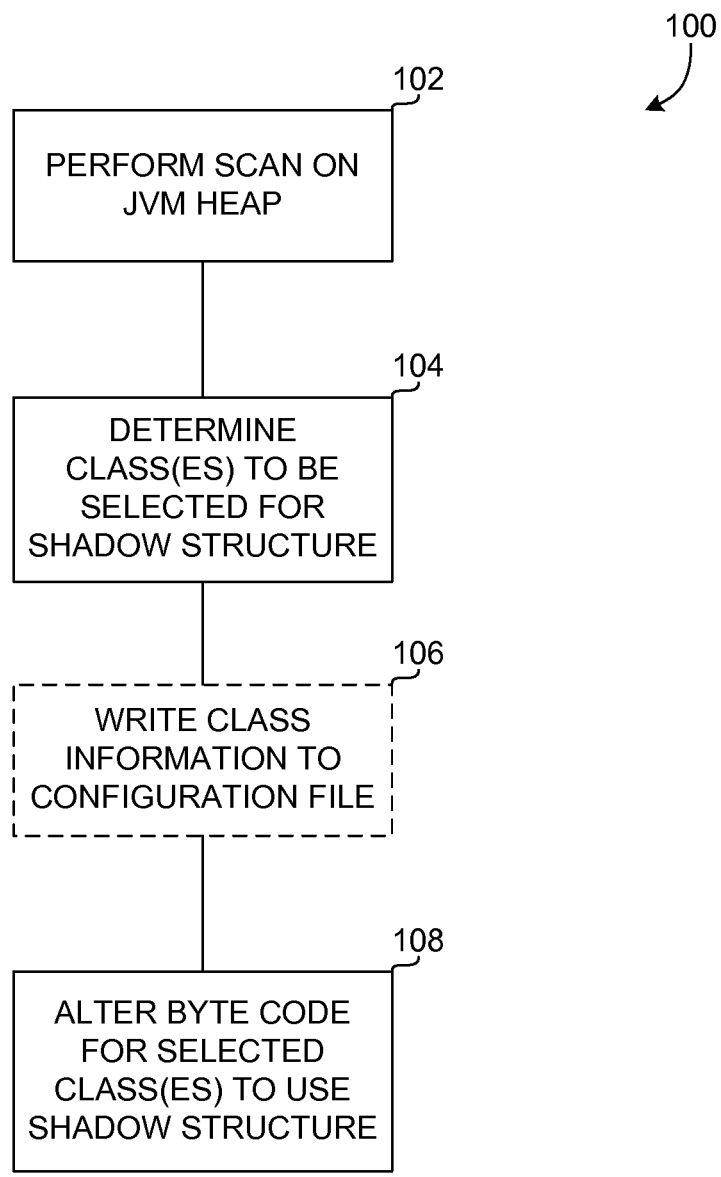
FIG. 1 illustrates a first example of a computer-controlled method in accordance with certain implementations of the disclosed technology.

As used herein, the interchangeable terms rarely-used member variables and rarely-used fields generally refer to one or more data fields within a class that usually—or always—have a null or zero value. Such rarely-used fields may be easily identified by heap dump analysis, for example, because they generally have null, 0 or 0.0 values in all or most of the instances. While some of these fields may be dead, they are typically still used in methods though possibly not for a current implementation or workload. Except for dead fields, these rarely-used fields remain part of the corresponding class and typically cannot be removed. However, these fields tend to result in a significant waste of memory, processing efficiency, or both.

As used herein, the term shadow structure generally refers to a regular Java class, e.g., a static inner class, that has the rarely-used fields declared inside it and does not have any methods. The term shadow reference generally refers to a regular Java reference whose declared type is the same as that of the shadow structure.

In certain implementations of the disclosed technology, rarely-used member variables may be removed from one or more class definitions in order to save heap space. The disposal of such fields will not only save memory but also generally improve the response time and garbage collection (GC) overhead of the corresponding process. A shadow structure may be created for the object instances that need to store data in the rarely-used member variables.

In certain embodiments, one or more rarely-used fields may be moved into a shadow structure and a reference to the shadow structure may be added to the original class. Initially, the shadow reference may be set to a null value. This may advantageously preserve memory space because the original class does not need to use heap space for the rarely-used fields. Because the shadow reference generally consumes 4 or 8 bytes, implementations are better suited for classes having more than 4 or 8 bytes of rarely-used fields.

In operation, read/write accesses to rarely-used fields, such as GETFIELD/PUTFIELD byte code instructions, may be replaced with calls to custom private getter/setter methods, for example. In certain embodiments where a custom setter method is first called for a given instance, the shadow structure may be created and the shadow reference will typically point to the structure. Read/write accesses to the rarely-used fields may then be performed on the corresponding fields in the shadow structure. These operations may be performed in bytecode and, in certain implementations, a Just-In-Time (JIT) optimizer may be used to inline the call and reduce the code to a predictable branch and memory indirection, for example.

Creating a shadow structure in accordance with the disclosed technology generally includes additional overhead that is greater than simply the rarely-used fields. For example, such structure typically also has an object header, e.g., 8, 12 or 16 bytes. This overhead may limit the usefulness of the optimization for classes that actually do use the rarely-used fields in some of the instances.

FIG. 1 illustrates a first example of a computer-controlled method 100 in accordance with certain implementations of the disclosed technology. At 102, a scan is performed on the heap of an actively running JVM to determine which classes have one or more rarely-used fields. Alternatively, particularly in cases where scanning the heap in a live process is too difficult, a heap dump may be taken and analyzed.

Figure 2:
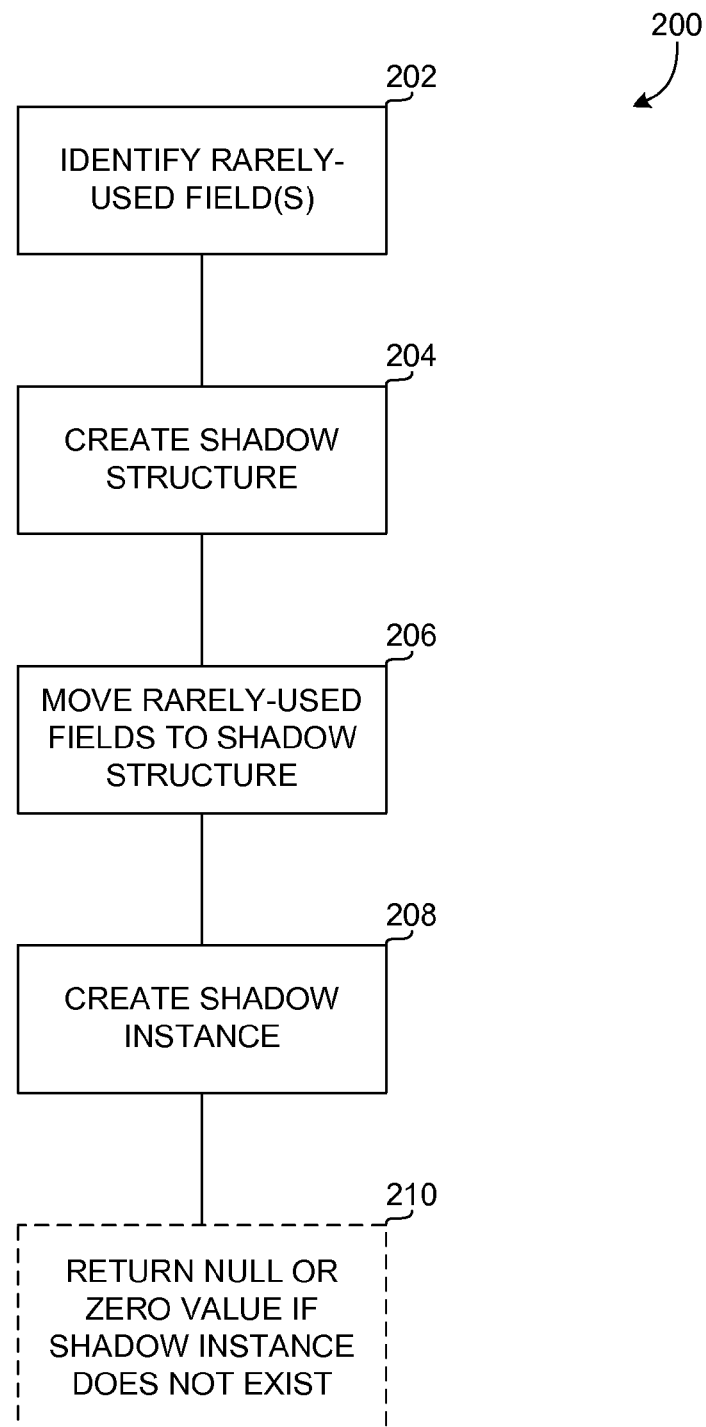
FIG. 2 illustrates a second example of a computer-controlled method in accordance with certain implementations of the disclosed technology.

At 104, a determination is made as to which classes should be selected for use of a shadow structure. Such information may be written to a configuration text file, as indicated by 106. At 108, the byte code corresponding to the selected classes may be altered to use a shadow structure as illustrated by FIG. 2, for example. The processing at 108 may be performed during runtime as classes—and the configuration file, as generated at 106—are loaded.

FIG. 2 illustrates a second example of a computer-controlled method 200 in accordance with certain implementations of the disclosed technology. At 202, one or more rarely-used fields are identified with a given class. At 204, a shadow structure may be created. Any or all of the identified rarely-used fields in the class may be moved to the shadow structure, as indicated by 206. In certain embodiments, for example, only rarely-used fields totaling a size of at least 5 bytes are moved to the shadow instance. At 208, a shadow instance may be created, e.g., using a Putfield function. In certain embodiments, a certain function, e.g., Getfield function, may return a null or zero value if the shadow instance does not exist, as indicated by 210.

Figure 3:
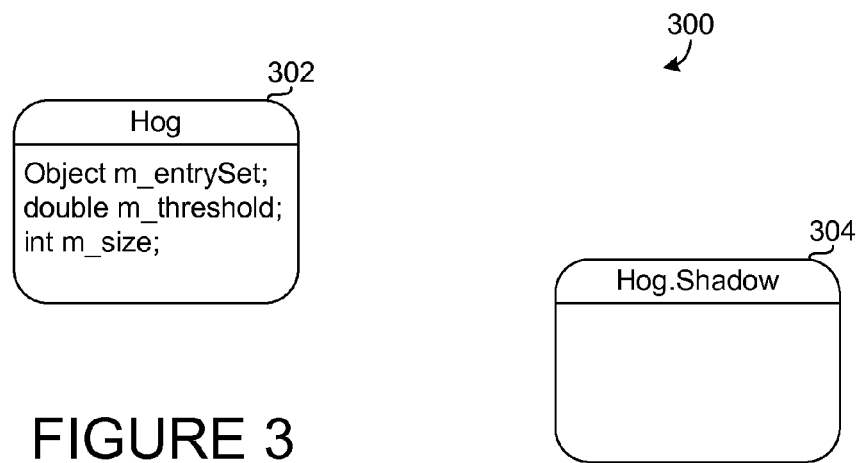
FIG. 3 illustrates a first example of a shadow structure in accordance with certain implementations of the disclosed technology.

FIG. 3 illustrates a first example 300 of a shadow structure in accordance with certain implementations of the disclosed technology. In the example, an existing class 302 named Hog has three fields that have been identified as rarely-used fields. A shadow structure 304 named Hog.Shadow is created.

Figure 4:
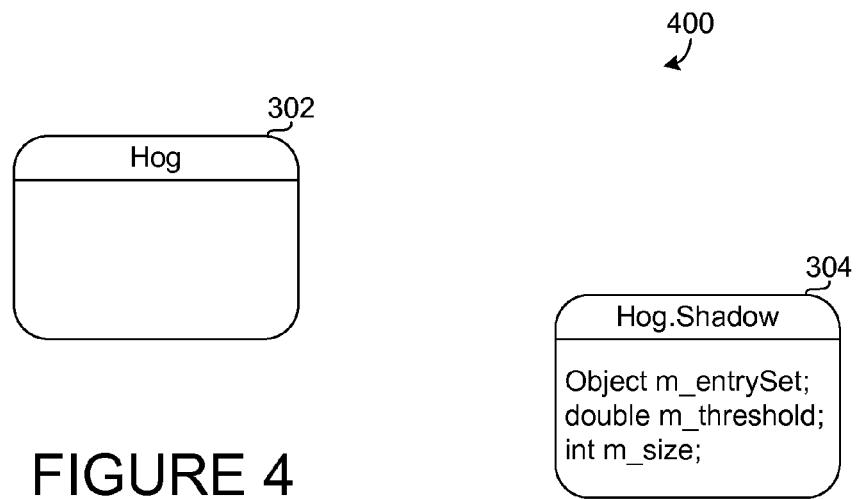
FIG. 4 illustrates a second example of a shadow structure in accordance with certain implementations of the disclosed technology.

FIG. 4 illustrates a second example 400 of the shadow structure illustrated by FIG. 3 in accordance with certain implementations of the disclosed technology. In the example, the three identified rarely-used fields have been moved from the existing class 302 to the shadow structure 304. For example, a Putfield function or other function may be used to create the shadow instance using double-checked locking.

Figure 5:
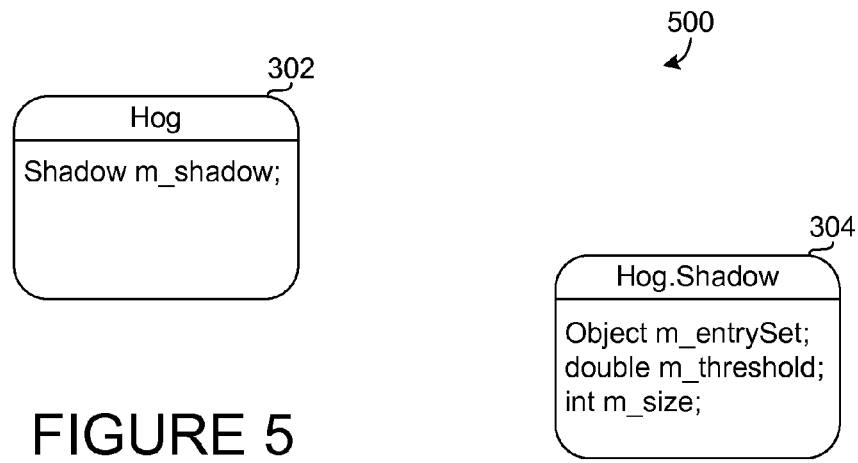
FIG. 5 illustrates a third example of a shadow structure in accordance with certain implementations of the disclosed technology.

FIG. 5 illustrates a third example 500 of the shadow structure illustrated by FIGS. 3 and 4 in accordance with certain implementations of the disclosed technology. Here, a reference to the shadow structure, also referred to as a shadow reference, has been added to the class 302. In certain embodiments, a Getfield function may return a null or zero value if the shadow instance does not exist.

The following formula may be used to calculate how much memory will be saved by implementing a shadow structure for a given class:

$$(sizeof(\text{rarely-used fields}) - sizeof(\text{shadow reference}))*total\_instances - sizeof(\text{shadow structure})*using\_instances$$

where:
- sizeof(rarely-used fields) generally refers to the number of bytes that the rarely-used fields take in the heap for one instance of the class
- sizeof(shadow reference) generally refers to the number of bytes that a reference takes in the heap. For example, 4 bytes for 64-bit Java virtual machines (JVMs) with compressed references and 32-bit JVMs; otherwise, 8 bytes
- total_instances generally refers to the number of instances of the class
- sizeof(shadow structure) generally refers to the number of bytes for the header and member fields. For example, 8 bytes for 32-bit HotSpot and, for 64-bit HotSpot, the header is 16 bytes (or 12 bytes if compressed references are used)
- using_instances generally refers to the number of instances of the class that actually store a non-zero/non-null value in the 'rarely-used' fields The following is an example class to be optimized in accordance with the disclosed technology:

```
public class Hog
{
    private Object m_entrySet;
    private double m_threshold;
    private int m_size;
    public void squeal( )
    {
        if (m_size == 0)
        {
            m_entrySet = "Oink!";
            m_threshold = 12.0;
            m_size = 3;
        }
    }
    ...
    // Other methods
}
```

The following represents an optimization of the example class presented above after application of the disclosed shadow structure techniques:

```
public class Hog
{
    private volatile Shadow m_shadow;
    public void squeal( )
    {
        if (shadowGet_Size( ) == 0)
        {
            shadowSet_EntrySet("Oink!");
            shadowSet_Threshold(12.0);
            shadowSet_Size(3);
        }
    }
    private Shadow createShadowStructure( )
    {
        synchronized (this)
        {
            if (m_shadow == null)
                m_shadow = new Shadow( );
        }
        return(m_shadow);
    }
    private int shadowGet_Size( )
    {
        Shadow shadow;
        shadow = m_shadow;
        if (shadow == null) // If the shadow structure doesn't exist, then...
            return(0); // ... the value is still the default.
        return(shadow.m_size);
    }
    private void shadowSet_Size(int value)
    {
        Shadow shadow;
        shadow = m_shadow;
        if (shadow == null)
        {
            if (value == 0) // Do not create a shadow structure if the field is going to be assigned zero
                return;
            shadow = createShadowStructure( );
        }
        shadow.m_size = value;
    }
    private static class Shadow
    {
        private Object m_entrySet;
        private double m_threshold;
        private int m_size;
    }
}
```

In certain embodiments, during run time, a background thread may periodically scan the heap and determine which classes—and fields—should be shadowed. These classes may then be dynamically altered in order to use a shadow structure. If, at any future point in time, the shadowing is not saving memory, e.g., too many instances are using the fields, the class (or multiple classes, if applicable) may be dynamically altered so as to not use a shadow structure. Because the dynamic altering of classes generally requires a full GC, however, the background thread typically won't make changes very often.

Certain implementations of the disclosed technology generally rely on JEP 159: Enhanced Class Redefinition. This enhancement generally allows the corresponding JVM—or debugger—to make arbitrary valid changes to the classes at runtime. However, one having ordinary skill in the art will appreciate that virtually any program can take advantage of the techniques described herein in order to dispose of rarely-used member variables.

The following discussion is intended to provide a brief, general description of a suitable machine in which embodiments of the disclosed technology can be implemented. As used herein, the term "machine" is intended to broadly encompass a single machine or a system of communicatively coupled machines or devices operating together. Exemplary machines may include computing devices such as personal computers, workstations, servers, portable computers, handheld devices, tablet devices, and the like.

Typically, a machine includes a system bus to which processors, memory such as random access memory (RAM), read-only memory (ROM), and other state-preserving medium, storage devices, a video interface, and input/output interface ports can be attached. The machine may also include embedded controllers such as programmable or non-programmable logic devices or arrays, Application Specific Integrated Circuits (ASICs), embedded computers, smart cards, and the like. The machine may be controlled, at least in part, by input from conventional input devices such as keyboards and mice, as well as by directives received from another machine, interaction with a virtual reality (VR) environment, biometric feedback, or other pertinent input.

The machine may utilize one or more connections to one or more remote machines, such as through a network interface, modem, or other communicative coupling. Machines can be interconnected by way of a physical and/or logical network, such as an intranet, the Internet, local area networks, wide area networks, etc. One having ordinary skill in the art will appreciate that network communication may utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

Embodiments of the disclosed technology may be described by reference to or in conjunction with associated data including functions, procedures, data structures, application programs, instructions, etc. that, when accessed by a machine, may result in the machine performing tasks or defining abstract data types or low-level hardware contexts. Associated data may be stored in, for example, volatile and/or non-volatile memory, such as RAM and ROM, or in other storage devices and their associated storage media, which can include hard-drives, floppy-disks, optical storage, tapes, flash memory, memory sticks, digital video disks, biological storage, and other non-transitory, physical storage media.

Associated data may be delivered over transmission environments, including the physical and/or logical network, in the form of packets, serial data, parallel data, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

We claim:

1. A computer-controlled method, comprising:
   determining at least one rarely-used field within a first class, the at least one rarely used field within the first class having either a null value or a zero value;
   creating a first shadow structure corresponding to the first class;
   moving the at least one rarely-used field from the first class to the first shadow structure corresponding to the first class; and
   storing first data in the at least one rarely-used field in the first shadow structure.

2. The computer-controlled method of claim 1, wherein the first shadow structure is a static inner class.

3. The computer-controlled method of claim 1, wherein the at least one rarely-used field has a total size that is no less than 5 bytes.

4. The computer-controlled method of claim 1, wherein the at least one rarely-used field has a total size that is no less than 9 bytes.

5. The computer-controlled method of claim 1, wherein the determining comprises analyzing a heap of an actively running process.

6. The computer-controlled method of claim 5, wherein the heap scan is integrated with garbage collection (GC).

7. The computer-controlled method of claim 1, wherein the determining comprises analyzing a heap dump.

8. The computer-controlled method of claim 1, further comprising adding a shadow reference to the first class, the shadow reference corresponding to the first shadow structure.

9. The computer-controlled method of claim 8, wherein the shadow reference has a declared type that is the same as that of the shadow structure.

10. The computer-controlled method of claim 8, wherein adding a shadow reference to the first class is integrated with garbage collection (GC).

11. The computer-controlled method of claim 1, further comprising replacing read/write accesses to the at least one rarely-used field with custom private getter/setter methods.

12. The computer-controlled method of claim 1, further comprising:
  determining at least one rarely-used field within a second class, the at least one rarely used field within the second class having either a null value or a zero value;
  creating a second shadow structure corresponding to the second class; and
  moving the at least one rarely-used field from the second class to the second shadow structure corresponding to the second class.

13. The computer-controlled method of claim 12, further comprising adding a first shadow reference to the first class and a second shadow reference to the second class, the first and second shadow references corresponding to the first and second shadow structures, respectively.

14. The computer-controlled method of claim 12, wherein the first and second shadow structures are static inner classes.

15. One or more non-transitory computer-readable media storing executable instructions that, when executed by a processor, cause the processor to perform the computer-controlled method of claim 1.

16. A system, comprising:
  a memory; and
  a processor configured to:
    determine at least one rarely-used field within a class, the at least one rarely used field within the first class having either a null value or a zero value;
    create a shadow structure corresponding to the class, wherein the memory is configured to store the shadow structure;
    move the at least one rarely-used field from the class to the shadow structure corresponding to the class; and
    cause data to be stored in the at least one rarely-used field in the shadow structure.

17. The system of claim 16, wherein the processor is further configured to add a shadow reference to the class, the shadow reference corresponding to the shadow structure.

18. The system of claim 16, wherein the processor is configured to perform the determining by performing a scan on a heap of an actively running Java virtual machine (JVM).

19. The computer-controlled method of claim 12, further comprising storing second data in the at least one rarely-used field in the second shadow structure.

20. The computer-controlled method of claim 12, further comprising:
  determining at least one rarely-used field within a third class, the at least one rarely used field within the third class having either a null value or a zero value;
  creating a third shadow structure corresponding to the third class; and
  moving the at least one rarely-used field from the third class to the third shadow structure corresponding to the third class.

21. The computer-controlled method of claim 20, further comprising storing third data in the at least one rarely-used field in the third shadow structure.

* * * * *